(12) United States Patent
Lin

(10) Patent No.: US 10,661,893 B2
(45) Date of Patent: May 26, 2020

(54) LIGHTWEIGHT FLYING VEHICLE

(71) Applicant: Yao-Chang Lin, Hsinchu (TW)

(72) Inventor: Yao-Chang Lin, Hsinchu (TW)

( * ) Notice: Subject to any disclaimer, the term of this patent is extended or adjusted under 35 U.S.C. 154(b) by 238 days.

(21) Appl. No.: 15/832,299

(22) Filed: Dec. 5, 2017

(65) Prior Publication Data

US 2018/0334252 A1 Nov. 22, 2018

(30) Foreign Application Priority Data

May 19, 2017 (TW) .............................. 106116791 A

(51) Int. Cl.
| | | |
|---|---|---|
| *B64C 29/02* | (2006.01) | |
| *B64C 39/02* | (2006.01) | |
| *B64C 11/48* | (2006.01) | |
| *B64D 35/04* | (2006.01) | |
| *B64C 15/02* | (2006.01) | |
| *B64C 11/00* | (2006.01) | |

(52) U.S. Cl.
CPC ............ *B64C 29/02* (2013.01); *B64C 11/001* (2013.01); *B64C 11/48* (2013.01); *B64C 15/02* (2013.01); *B64C 39/026* (2013.01); *B64D 35/04* (2013.01)

(58) Field of Classification Search
CPC ......... B64C 15/02; B64C 27/20; B64C 29/00; B64C 29/02; B64C 29/04; B64C 39/026
See application file for complete search history.

(56) References Cited

U.S. PATENT DOCUMENTS

| | | | | |
|---|---|---|---|---|
| 3,173,629 | A * | 3/1965 | Uhor .................. | B64C 29/00 244/46 |
| 4,379,532 | A * | 4/1983 | Dmitrowsky ......... | B64C 39/026 244/4 A |
| 5,765,783 | A * | 6/1998 | Albion ................ | B64C 29/02 244/17.23 |
| 6,854,686 | B2 * | 2/2005 | Perlo .................. | B64C 39/026 244/23 R |
| 7,520,466 | B2 * | 4/2009 | Bostan ................ | B64C 3/385 244/93 |
| 7,658,346 | B2 * | 2/2010 | Goossen .............. | B64C 27/20 244/17.11 |
| 10,046,850 | B2 * | 8/2018 | Gamble .............. | B64C 1/26 |
| 10,059,442 | B2 * | 8/2018 | Olm .................... | B64C 29/02 |
| 10,246,185 | B2 * | 4/2019 | Carlin ................. | B64C 25/32 |
| 10,414,491 | B2 * | 9/2019 | Milani ................. | B64C 27/20 |
| 2006/0192047 | A1 * | 8/2006 | Goossen .............. | B64C 27/20 244/17.23 |
| 2006/0231675 | A1 * | 10/2006 | Bostan ................ | B64C 3/385 244/12.1 |
| 2007/0130913 | A1 * | 6/2007 | Harrison .............. | B64C 11/001 60/226.3 |
| 2009/0224095 | A1 * | 9/2009 | Cox .................... | B64C 27/20 244/17.23 |

(Continued)

*Primary Examiner* — Joseph W Sanderson

(57) ABSTRACT

A lightweight flying vehicle includes a carrier body, at least two fan-tube propulsion devices, two steering devices and a flight wing. The fan-tube propulsion devices are respectively disposed at two opposite sides of the carrier body and have a sufficient propulsion force. The steering device is disposed on a moving line of the airflow discharged from the fan-tube propulsion devices and is configured to change a direction of the airflow discharged from the air discharge opening, so that the lightweight flying vehicle is in a high-speed flight mode. The flight wing can provide a lift power in the high-speed flight mode.

5 Claims, 5 Drawing Sheets

(56) References Cited

U.S. PATENT DOCUMENTS

| | | | |
|---|---|---|---|
| 2013/0206921 A1* | 8/2013 | Paduano | B64C 13/16 244/7 C |
| 2014/0014766 A1* | 1/2014 | Redmon | B64C 39/02 244/13 |
| 2017/0008625 A1* | 1/2017 | Olm | B64C 29/02 |
| 2017/0283033 A1* | 10/2017 | Gamble | B64C 1/26 |
| 2017/0361929 A1* | 12/2017 | Demonfort | B64C 39/026 |
| 2017/0369163 A1* | 12/2017 | Carlin | B64C 25/32 |
| 2018/0029704 A1* | 2/2018 | Milani | B64C 29/0033 |

* cited by examiner

LIGHTWEIGHT FLYING VEHICLE

FIELD OF THE INVENTION

The present invention relates to a flying vehicle, and more particularly to a lightweight flying vehicle.

BACKGROUND OF THE INVENTION

Current aeronautical technology has been actively developing single-user vertical-lift vehicles. These current flying vehicles are flying at limited speeds less than some ground-based vehicles, such as cars or trains. Therefore, at present, since being unable to reach the general speed of the vehicles on the ground, so although the above aircraft is now available, this type of flying vehicles is still of no practical value in the present social life.

SUMMARY OF THE INVENTION

The present invention provides a lightweight flying vehicle that can be in high-speed flight mode.

The present invention provides a lightweight flying vehicle, which includes a carrier body, at least two fan-tube propulsion devices, two steering devices and a flight wing.

The fan-tube propulsion devices are respectively disposed at two opposite sides of the carrier body. The fan-tube propulsion device includes a cylinder body and at least one set of blades.

The cylinder body has an airflow channel, an air inlet opening and an air discharge opening. The blade is disposed in the airflow channel and configured to generate airflow. The airflow enters the airflow channel from the air inlet opening and subsequently is discharged from the air discharge opening to generate a motive power.

Each steering device is connected behind the fan-tube propulsion device and has at least one directional plate member. The directional plate member is disposed on a moving line of the airflow discharged from the air discharge opening and is configured to change a direction of the airflow discharged from the air discharge opening, so that the lightweight flying vehicle is in a high-speed flight mode.

The flight wing is disposed on a back of the carrier body and configured to provide a lift power when the lightweight flying vehicle is in the high-speed flight mode.

A low-speed moving mode is referred to as a cruising status in which an inclination angle of a long axis direction of the carrier body with respect to a geocentric vertical line is less than 45 degrees. The high-speed moving mode is referred to as a cruising status in which an inclination angle of the long axis direction of the carrier body with respect to a sea level direction is less than 45 degrees.

The carrier body has an accommodating cabin. The accommodating cabin has a shape corresponding to a shape of a human body. A part of the carrier body corresponding to a human head is made of a transparent material.

Further, the fan-tube propulsion device includes a first set of blades, a second set of blades and an accelerating transmission. The first set of blades is connected to the second set of blades by the accelerating transmission. The first set of blades has a first rotation speed. The accelerating transmission is configured to cause the second set of blades to have a second rotation speed, wherein a ratio of the second rotation speed to the first rotation speed is greater than or equal to 1.2.

The flight wing includes a first wing plate, a second wing plate and a plurality of connectors. A spacing is formed between the first wing plate and the second wing plate so that the first wing plate and the second wing plate respectively serve as an upper surface and a lower surface of the flight wing. The connectors correspond to the spacing to fixedly connect the first wing plate and the second wing plate.

By the design of the fan-tube propulsion device, the lightweight flying vehicle in the low-speed flight mode can take off and land anywhere. Further, the lightweight flying vehicle can be switched from the low-speed flight mode to the high-speed flight mode for flight with the assistance of the steering device and the flight wing to meet or exceed the general speed of the transportation on the ground.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
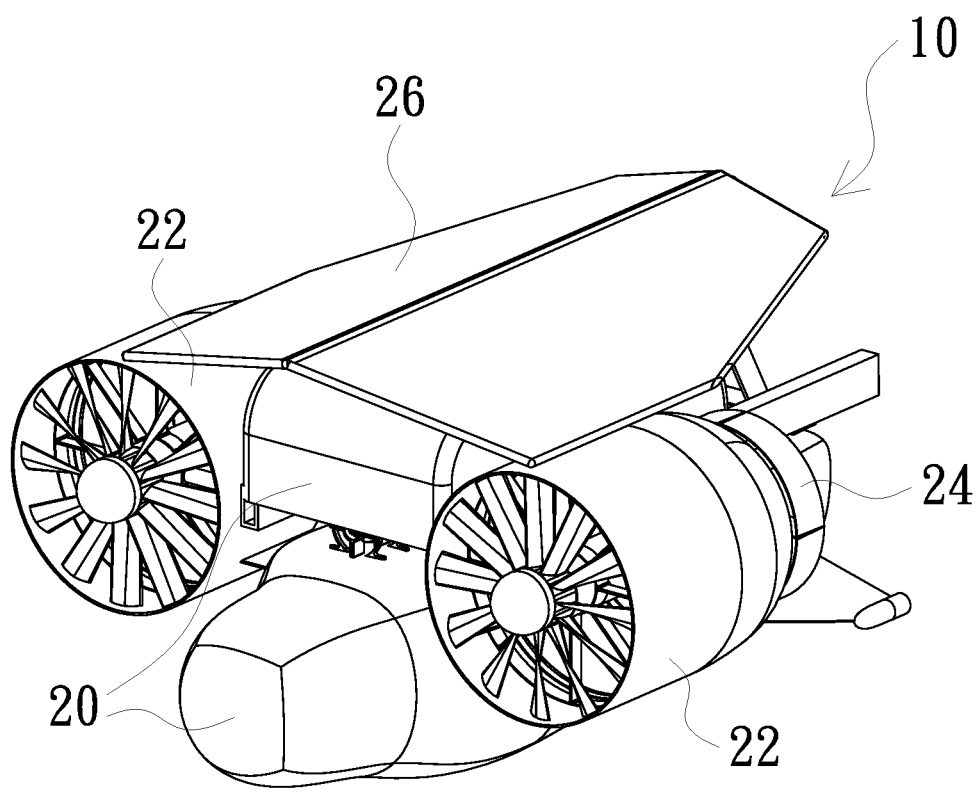
FIG. 1 is a schematic view of the appearance of a lightweight flying vehicle according to an embodiment of the present invention.

Please refer to FIG. 1, which is a schematic view of the appearance of a lightweight flying vehicle 10. The lightweight flying vehicle 10 includes a carrier body 20, two fan-tube propulsion devices 22, two steering devices 24 and a flight wing 26. The lower part of the carrier body 20 can be used to load goods or persons. The upper part of the carrier body 20 is used to install an engine and a fuel tank (not shown). The engine can be the power source of the carrier body 20 and the fuel tank supplies the fuel required by the engine. The engine can provide the motive power required by the two fan-tube propulsion device 22 through the transmission system and steering gear.

The two fan-tube propulsion devices 22 are respectively fixed on two opposite sides of the carrier body 20. The fan-tube propulsion devices 22 are connected to the power source in the carrier body 20 through the transmission system and are configured to generate the motive power. The two steering devices 24 are respectively connected to the exhaust ends of the two fan-tube propulsion devices 22 and are configured to steer the entire lightweight flying vehicle 10 to switch the lightweight flying vehicle 10 to a low-speed flight mode or a high-speed flight mode.

Figure 2:
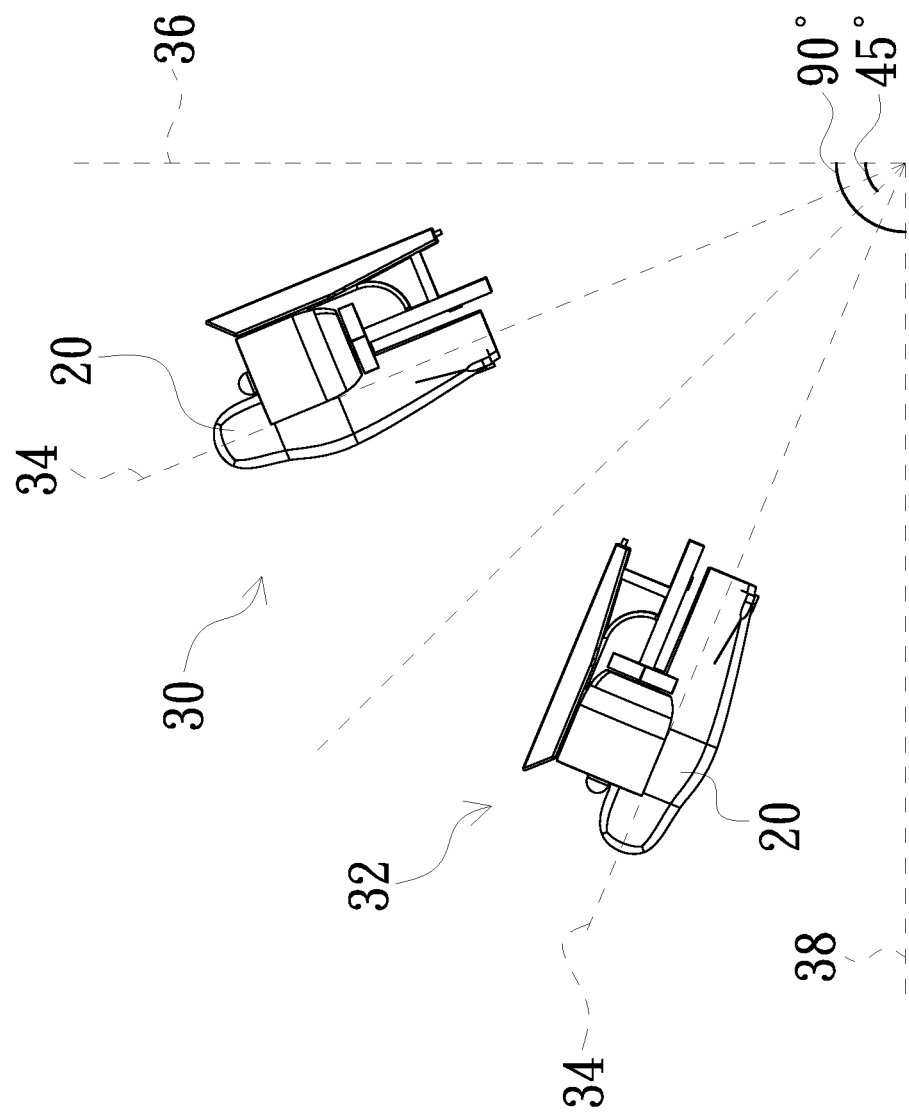
FIG. 2 is a schematic view of two flight modes of the lightweight flying vehicle in FIG. 1.

Please refer to FIG. 1 and FIG. 2. FIG. 2 is a schematic view of the two flight modes of the lightweight flying vehicle 10. The lightweight flying vehicle 10 has two flight modes, which are the low-speed flight mode 30 and the high-speed flight mode 32. In addition, the flight directions of the two lightweight flying vehicles 10 shown in FIG. 2 may be close to or parallel to the sea level direction 38, whether in the low-speed flight mode 30 or the high-speed flight mode 32.

The low-speed flight mode 30 is referred to as a cruising status in which the inclination angle of the long axis direction 34 of the carrier body 20 with respect to the geocentric vertical line 36 is less than 45 degrees. In the low-speed flight mode 30, the motive power and lift power of the lightweight flying vehicle 10 are all provided by the fan-tube propulsion devices 22, so that the lightweight flying vehicle 10 can make a helicopter-like hovering, left-side fly, right-side fly, forward fly and back fly and other movements, thereby allowing the lightweight flying vehicle 10 to take off and land anywhere. Therefore, the low-speed flight mode 30 may also be referred to as a helicopter flight mode. In addition, the lightweight flying vehicle 10 in the low-speed flight mode 30 can fly at speeds below 100 kilometers per hour.

The high-speed flight mode 32 is referred to as a cruising status in which the inclination angle of the long axis direction 34 of the carrier body 20 with respect to the sea level direction 38 is less than 45 degrees. In the high-speed flight mode 32, the flying speed of the lightweight flying vehicle 10 can be higher than 100 kilometers per hour, and can even higher than 500 kilometers per hour. In the high-speed flight mode 32, the flight wing 26 may begin to generate a great deal of resistance. By the steering devices 24, the flight wing 26 of the lightweight flying vehicle 10 can be adjusted to be parallel to the sea level direction 38, that is, the lightweight flying vehicle 10 is in a horizontal flight attitude. At this point, the flight wing 26 can generate enough lift force to support the weight, so the power provided by the fan-tube propulsion devices 22 is mostly used as a forward motive power for high-speed flying of the lightweight flying vehicle 10, and accordingly the lightweight flying vehicle 10 becomes a high-speed and efficient transportation tool. Therefore, the high-speed flight mode 32 may also be referred to as the airplane flight mode.

Figure 3:
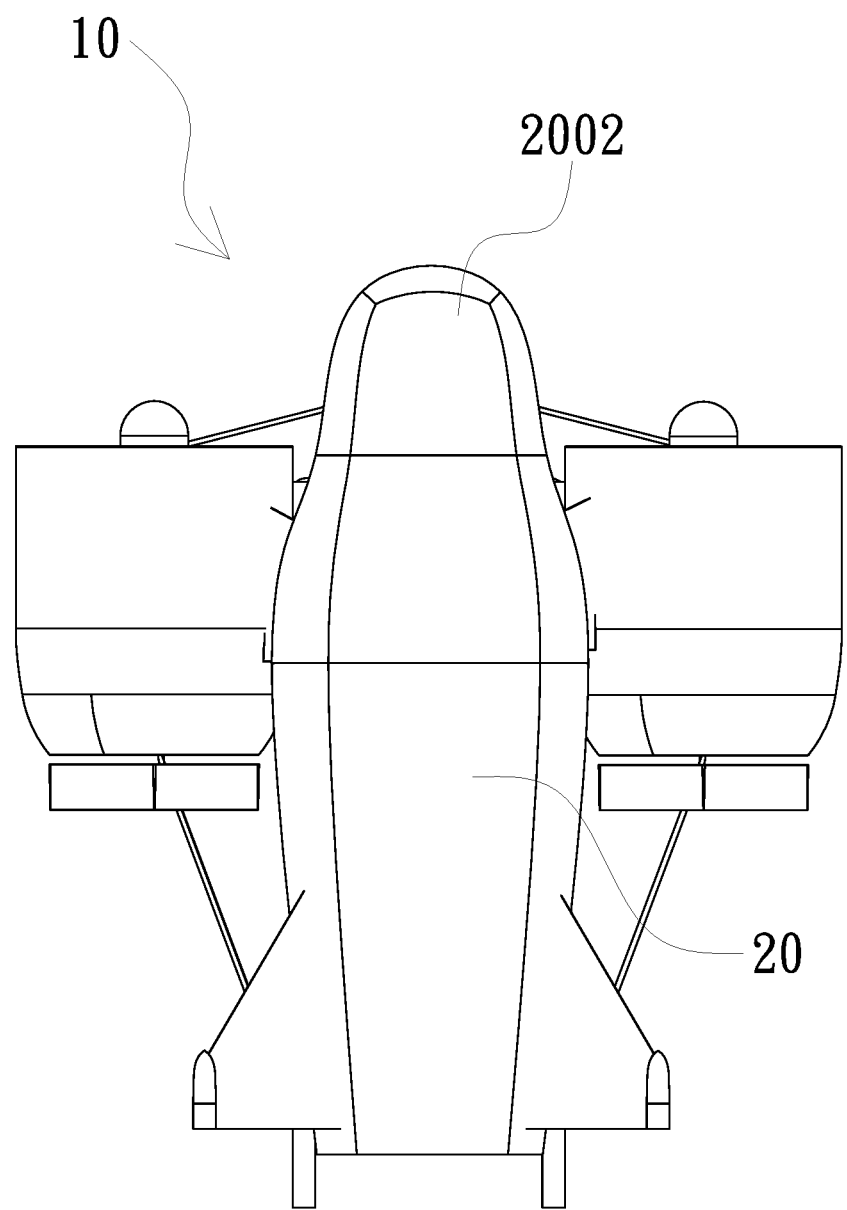
FIG. 3 is a schematic bottom view of the lightweight flying vehicle of FIG. 1.

Please refer to FIG. 3, which is a schematic bottom view of the lightweight flying vehicle 10 in the high-speed flight mode 32. FIG. 3 may refer to as a front view if the lightweight flying vehicle 10 is in a parked status or in a status similar to the low-speed flight mode 30. The carrier body 20 has an accommodating cabin (not shown) for carrying goods or person, wherein the accommodating cabin is designed to load goods or person under 300 kg. In order to meet the requirements of the loading of person, the shape of the accommodating cabin needs to be substantially similar to that of the human body. Further, the part 2002 of the carrier body 20 corresponding to the head of the human body may be made of a transparent material, so that the person in the accommodating cabin is provided with a good field of vision. The part 2002 of the carrier body 20 corresponding to the head of the human body may be disposed with a head-up display or some instrument displays for the person in the accommodating cabin to learn more about the flight situation.

Figure 4:
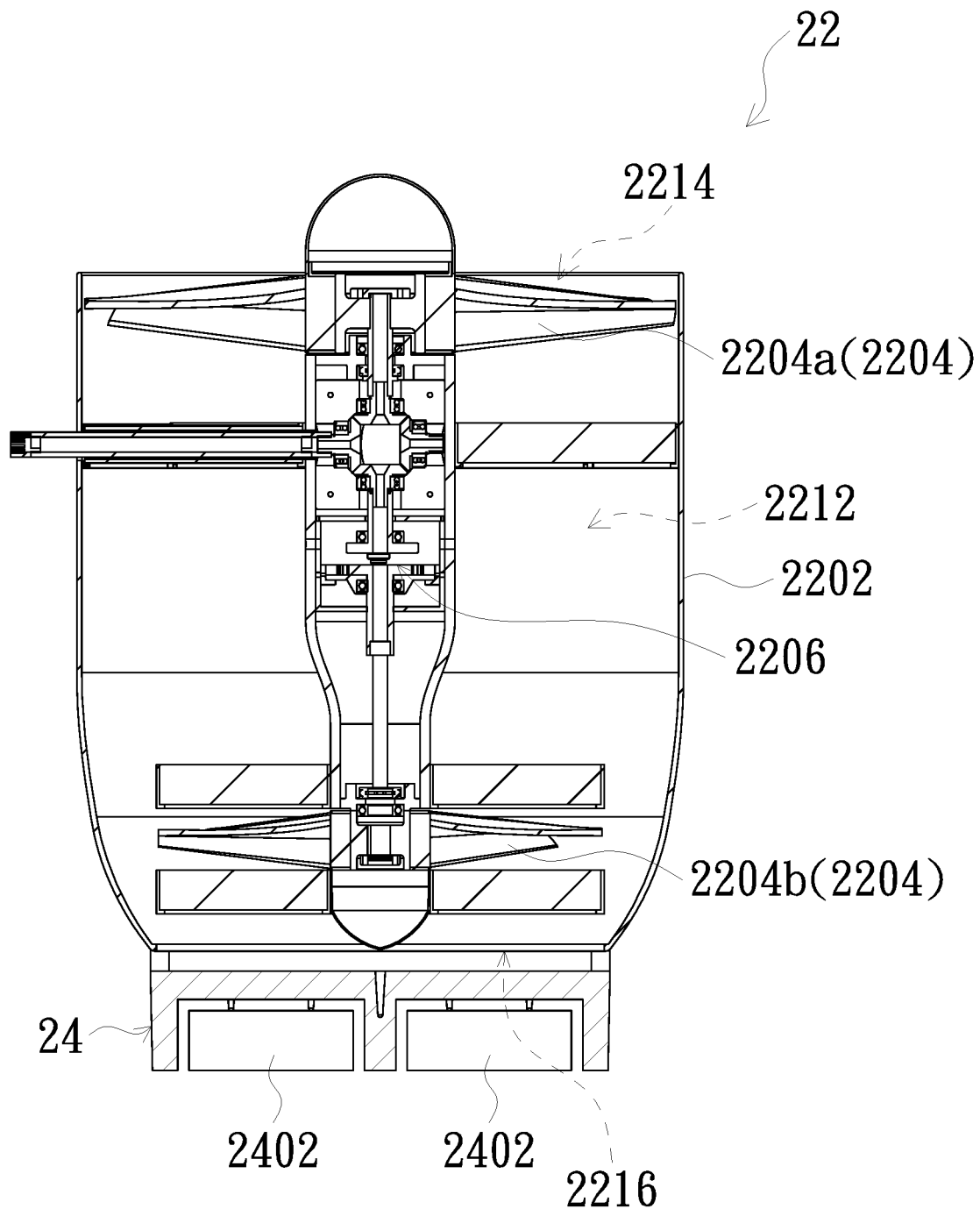
FIG. 4 is a cross-sectional view of the fan duct propulsion device in FIG. 1.

Please refer to FIG. 4, which is a cross-sectional view of the fan duct propulsion device in FIG. 1. The fan-tube propulsion device 22 includes a cylinder body 2202 and at least one set of blades 2204. In order to provide sufficient propulsion force, the fan-tube propulsion device 22 in FIG. 4 has two sets of blades 2204 therein. The cylinder body 2202 has an airflow channel 2212, an air inlet opening 2214 and an air discharge opening 2216. The sets of blades 2204 are disposed in the airflow channel 2212 and configured to generate airflow. The airflow enters the airflow channel 2212 from the air inlet opening 2214 and is subsequently discharged from the air discharge opening 2216 to produce mobile power.

In order to provide sufficient propulsion force, the fan-tube propulsion device 22 includes a first set of blades 2204a, a second set of blades 2204b and an accelerating transmission 2206. The first set of blades 2204a is connected to the second set of blades 2204b by the accelerating mechanism 2206. The first set of blades 2204a has a first rotation speed, and the accelerating transmission 2206 is configured to cause the second set of blades 2204b to have a second rotation speed, wherein a ratio of the second rotation speed to the first rotation speed is greater than or equal to 1.2. The first rotation speed may be between 1500 rpm and 6000 rpm and the second rotation speed may be between 1800 rpm and 9000 rpm. It is to be understood that the second rotation speed may also be 1500 rpm. Thus, the airflow generated by the first set of blades 2204a and the second set of blades 2204b is relatively great, thus greatly improving the motive power.

The steering device 24 has at least one directional board member 2402. The directional plate member 2402 is disposed on the moving line of the airflow discharged from the air discharge opening 2216. By changing the orientation of the directional plate member 2402 to the air discharge opening 2216, that is, changing the angle between the directional plate member 2402 and the air discharge opening 2216, the direction of the airflow discharged from the air discharge opening 2216 can be changed so as to change the inclination angle of the carrier body 20. Thus, the flight mode can be switched (i.e., switching between the high-speed flight mode 32 and the low-speed flight mode 30) in conjunction with the motive power of the fan-tube propulsion devices 22. In other words, with the highly propelled fan-tube propulsion devices 22 and the steering device 24, the lightweight flying vehicle 10 can be switched to fly in the low-speed flight mode 30 or the high-speed flight mode 32.

Figure 5:
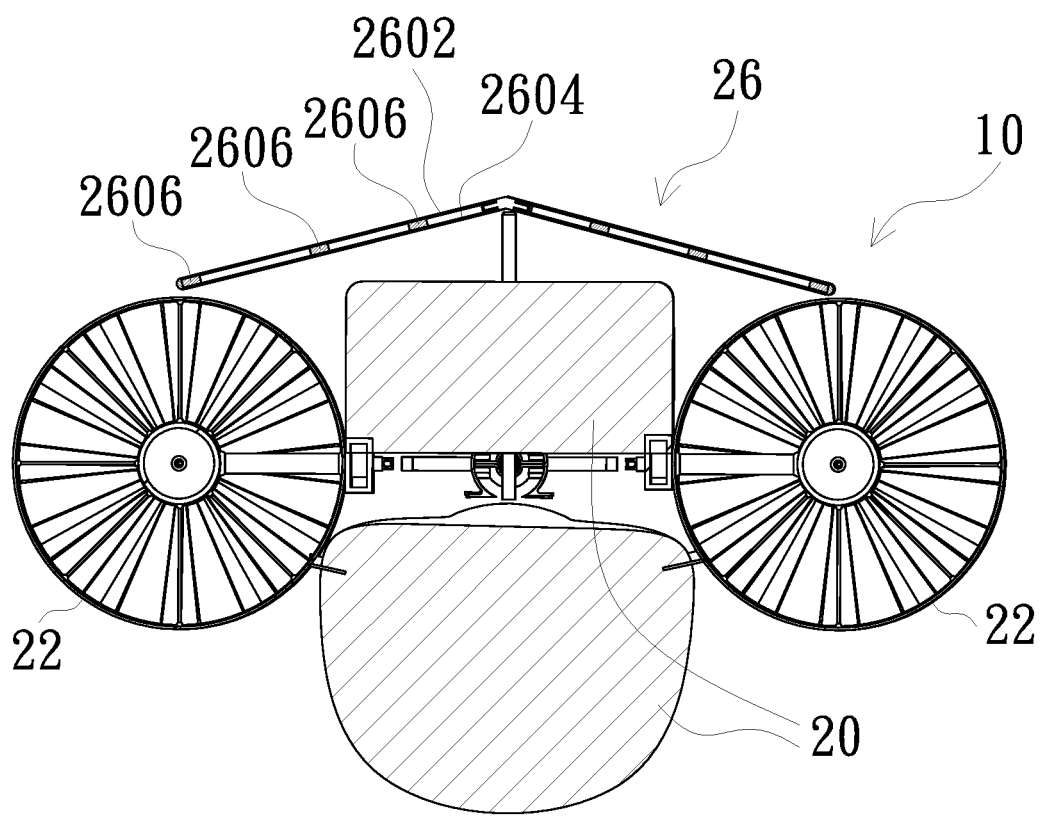
FIG. 5 is a schematic front view of the lightweight flying vehicle in FIG. 1.

Please refer to FIG. 5, which is a schematic front view of the lightweight flying vehicle in the high-speed flight mode 32. As shown in FIG. 5, the flight wing 26 is disposed on the back of the carrier body 20 and the fan-tube propulsion device 22 is mounted on both sides of the carrier body 20. In the high-speed flight mode 32, the flight wing 26 is configured to provide lift power. In addition, for lightweight design, the flight wing 26 further includes a first wing plate 2602, a second wing plate 2604 and a plurality of connectors 2606. Spacing is formed between the first wing plate 2602 and the second wing plate 2604, which respectively serve as an upper surface and a lower surface of the flight wing 26. The connectors 2606 correspond to the spacing to fixedly connect the first wing plate 2602 and the second wing plate 2604; therefore, the flight wing 26 may have the required structural strength but also have a light weight, thereby being conducive to flight.

Therefore, by the design of the fan-tube propulsion device 22, the lightweight flying vehicle 10 in the low-speed flight mode 30 can take off and land anywhere. Further, the lightweight flying vehicle 10 can be switched from the low-speed flight mode 30 to the high-speed flight mode 32 for flight with the assistance of the steering device 24 and the flight wing 26. Thus, the full-featured lightweight flight requirement is achieved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A flying vehicle, comprising:
a carrier body, having a back and two sides, wherein the back is between the two sides, and the two sides are opposite to each other;
at least two fan-tube propulsion devices, respectively fixed on the two sides of the carrier body, wherein each of the fan-tube propulsion devices comprises a cylinder body and at least one blade, the cylinder body has an airflow channel, an air inlet opening and an air discharge opening, the blade is disposed in the airflow channel and configured to generate an airflow, and the airflow enters the airflow channel from the air inlet opening and subsequently is discharged from the air discharge opening to generate a motive power;
two steering devices, respectively connected to the fan-tube propulsion devices, wherein each of the steering devices has at least one directional plate member, the directional plate member is disposed on a moving line of the airflow discharged from the air discharge opening and is configured to change a direction of the airflow discharged from the air discharge opening to switch the flying vehicle between a low-speed flight mode and a high-speed flight mode; and
a flight wing, disposed on the back of the carrier body, wherein the flight wing has a symmetry axis and two slopes;
wherein each of the two slopes extends from the symmetry axis to one of the fan-tube propulsion devices, and the slopes are not coplanar;
wherein a gap is formed between the two edges and the at least two fan-tube propulsion devices, and a distance between the symmetry axis and the back of the carrier body is longer than a distance between each of the slopes and an adjacent one of the at least two fan-tube propulsion devices;
wherein when the flying vehicle is in the low-speed flight mode, the flying vehicle flies at speeds below 100 kilometers per hour, and the flying vehicle is allowed to take off and land;
wherein when the flying vehicle is in the high-speed flight mode, the flying vehicle flies at speeds larger than 100 kilometers per hour, and the flight wing provides a lift power and then the flight wing is parallel to a sea level direction.

2. The flying vehicle according to claim 1, wherein the low-speed flight mode is referred to as a cruising status in which an inclination angle of a long axis direction of the carrier body with respect to a geocentric vertical line is less than 45 degrees, wherein the high-speed flight mode is referred to as a cruising status in which an inclination angle of the long axis direction of the carrier body with respect to a sea level direction is less than 45 degrees.

3. The flying vehicle according to claim 1, wherein the carrier body has an accommodating cabin, the accommodating cabin has a shape for loading a human body, and a part of the carrier body corresponding to a human head is made of a transparent material.

4. The flying vehicle according to claim 1, wherein each of the fan-tube propulsion devices comprises:
a first set of blades, having a first rotation speed;
a second set of blades, wherein the at least one blade comprises the first set of blades and the second set of blades; and
an accelerating transmission, wherein the first set of blades is connected to the second set of blades by the accelerating transmission, the accelerating transmission is configured to cause the second set of blades to have a second rotation speed, wherein a ratio of the second rotation speed to the first rotation speed is greater than or equal to 1.2.

5. The flying vehicle according to claim 1, wherein the flight wing comprises a first wing plate, a second wing plate and a plurality of connectors, a spacing is formed between the first wing plate and the second wing plate so that the first wing plate and the second wing plate respectively serve as an upper surface and a lower surface of the flight wing, and the connectors correspond to the spacing to fixedly connect the first wing plate and the second wing plate.

* * * * *